(12) United States Patent
Shibayama et al.

(10) Patent No.: US 12,157,620 B2
(45) Date of Patent: Dec. 3, 2024

(54) DELIVERY CONTAINER FOR DRONE

(71) Applicant: THE YOKOHAMA RUBBER CO., LTD., Tokyo (JP)

(72) Inventors: Satoshi Shibayama, Hiratsuka (JP); Kishin Hirajima, Hiratsuka (JP); Yugo Nagase, Hiratsuka (JP); Misa Kuwahara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 70 days.

(21) Appl. No.: 17/797,248

(22) PCT Filed: Nov. 17, 2020

(86) PCT No.: PCT/JP2020/042706
§ 371 (c)(1),
(2) Date: Aug. 3, 2022

(87) PCT Pub. No.: WO2021/199486
PCT Pub. Date: Oct. 7, 2021

(65) Prior Publication Data
US 2023/0066388 A1    Mar. 2, 2023

(30) Foreign Application Priority Data

Mar. 31, 2020  (JP) ................. 2020-061860

(51) Int. Cl.
*B65D 81/05* (2006.01)
*B64D 9/00* (2006.01)
(Continued)

(52) U.S. Cl.
CPC ............ *B65D 81/052* (2013.01); *B64D 9/00* (2013.01); *B64U 2101/64* (2023.01); *B64U 2101/69* (2023.01)

(58) Field of Classification Search
CPC .. B65D 81/03; B65D 81/052; B64U 2101/69; B64U 2101/64; B64D 9/00
(Continued)

(56) References Cited

U.S. PATENT DOCUMENTS

| 4,164,970 A | 8/1979 | Jordan |
| 6,258,424 B1 | 7/2001 | Oswald |

(Continued)

FOREIGN PATENT DOCUMENTS

| CN | 207090079 U | 3/2018 |
| CN | 109552757 A | 4/2019 |

(Continued)

*Primary Examiner* — Ernesto A Grano
(74) *Attorney, Agent, or Firm* — Carrier, Shende & Associates P.C.; Fulchand P. Shende; Joseph P. Carrier

(57) ABSTRACT

A delivery container for a drone includes: an outer container (2) which is formed of an elastic material and is watertight and has a load opening (3) that opens and closes which is provided with a water stop portion (3a) to be watertight; and a cushioning portion (5) formed of an elastic material having an air chamber (6) and which is interposed between a load (B) stored inside the outer container (2) and the outer container (2) to hold the load (B) within a predetermined range inside the outer container (2). The delivery container can prevent a load to be delivered from getting damaged or wet and can easily and more reliably protect the load is provided.

12 Claims, 18 Drawing Sheets

(51) Int. Cl.
*B64U 101/64* (2023.01)
*B64U 101/69* (2023.01)

(58) Field of Classification Search
USPC ........................................................ 206/522
See application file for complete search history.

(56) References Cited

U.S. PATENT DOCUMENTS

| | | | |
|---|---|---|---|
| 9,440,749 B1 | 9/2016 | Ye et al. | |
| 9,663,234 B1* | 5/2017 | Hanlon | B64D 17/60 |
| 9,914,539 B1 | 3/2018 | Bar-Zeev et al. | |
| 10,131,428 B1 | 11/2018 | Sopper et al. | |
| 10,137,986 B1 | 11/2018 | Bar-Zeev et al. | |
| 11,220,363 B2 | 1/2022 | Konig et al. | |
| 2008/0308448 A1 | 12/2008 | Allen | |
| 2017/0029108 A1 | 2/2017 | Potter et al. | |
| 2017/0203843 A1 | 7/2017 | Chan et al. | |
| 2017/0267347 A1* | 9/2017 | Rinaldi | B65D 81/18 |
| 2017/0267348 A1* | 9/2017 | Sweeny | B65D 5/5007 |
| 2019/0066032 A1* | 2/2019 | Taveira | G05D 1/0088 |
| 2019/0100307 A1* | 4/2019 | Beltman | G05D 1/0669 |
| 2019/0202563 A1* | 7/2019 | Wiggerich | B64C 37/02 |
| 2019/0258910 A1* | 8/2019 | Stoman | B64D 1/02 |
| 2019/0291865 A1* | 9/2019 | O'Donnell | B64C 39/024 |

FOREIGN PATENT DOCUMENTS

| | | |
|---|---|---|
| EP | 2478796 A1 | 7/2012 |
| FR | 2385606 A1 | 10/1978 |
| FR | 3075170 A1 | 6/2019 |
| JP | S51-018881 U | 2/1976 |
| JP | S60-193075 U | 12/1985 |
| JP | H04-53676 U | 5/1992 |
| JP | H06-42511 A | 2/1994 |
| JP | H10-47315 A | 2/1998 |
| JP | 3050126 U | 6/1998 |
| JP | 2000-514764 A | 11/2000 |
| JP | 2006-321511 A | 11/2006 |
| JP | 2011-042383 A | 3/2011 |
| JP | 2013-193567 A | 9/2013 |
| JP | 2018-118753 A | 8/2018 |
| JP | 2019-535603 A | 12/2019 |
| KR | 2001-0000922 A | 1/2001 |
| KR | 101653764 B1 | 9/2016 |

* cited by examiner

DELIVERY CONTAINER FOR DRONE

TECHNICAL FIELD

The present invention relates to a delivery container for a drone and more particularly relates to a delivery container for a drone that can prevent a load to be delivered from getting damaged or wet and can easily and more reliably protect the load.

BACKGROUND ART

In recent years, so-called drones that use air routes have been attracting attention as a means of delivering loads. By using drones, relatively small (light weight) loads can be rapidly delivered to locations where delivery using land routes and water routes is difficult. When delivering a load using a drone, if a cushioning material and the load are packed and delivered together in corrugated cardboard, the load may be damaged by impact from the corrugated cardboard falling. Further, corrugated cardboard cannot sufficiently prevent the load stored therein from getting wet during delivery in rainy weather.

Thus, a package using an outer container such as corrugated cardboard and an inner packaging material has been proposed (see Patent Document 1). In the package proposed in Patent Document 1, the inner packaging material storing the load is held in a suspended state inside the outer container by a plurality of elastic towing ropes. Then, the inner packaging material storing the load is closed and the inside thereof is evacuated. Even if the load is held in a suspended state inside the outer container, when the outer container falls and is greatly deformed or damaged, the impact force also acts on the load, and so the load cannot be sufficiently protected. In addition, suspending the load in this way takes a lot of time and effort. Further, even if the inside of the inner packaging material can be evacuated to protect the load from moisture, it takes time and effort to evacuate the inside. Thus, there is room for improvement in more easily and reliably protecting the load.

CITATION LIST

Patent Literature

Patent Document 1: JP 2019-535603 T

SUMMARY OF INVENTION

Technical Problem

An object of the present invention is to provide a delivery container for a drone that can prevent a load to be delivered from getting damaged or wet and can easily and more reliably protect the load.

Solution to Problem

To achieve the object described above, a delivery container for a drone according to the present invention is a delivery container for a drone including an outer container held by a drone and a cushioning portion stored inside the outer container. The outer container is formed of an elastic material and is watertight, and a load opening of the outer container that opens and closes is designed to be watertight. The cushioning portion is interposed between a load stored inside the outer container and the outer container to hold the load within a predetermined range inside the outer container.

Advantageous Effects of Invention

According to the present invention, the load is protected from the impact force by a cushioning effect of the outer container formed of an elastic material and a cushioning effect of the cushioning portion stored inside the outer container. Further, since the outer container is watertight and the load opening is also designed to be watertight, it is possible to prevent the load from getting wet even during delivery in rainy weather. Even with this simple configuration, it is possible to more reliably protect the load.

BRIEF DESCRIPTION OF DRAWINGS

FIG. 14(A) is an explanatory diagram illustrating a state in which two independent air chambers are combined. FIG. 14(B) is an explanatory diagram illustrating each air chamber independently.

DESCRIPTION OF EMBODIMENTS

Figure 1:
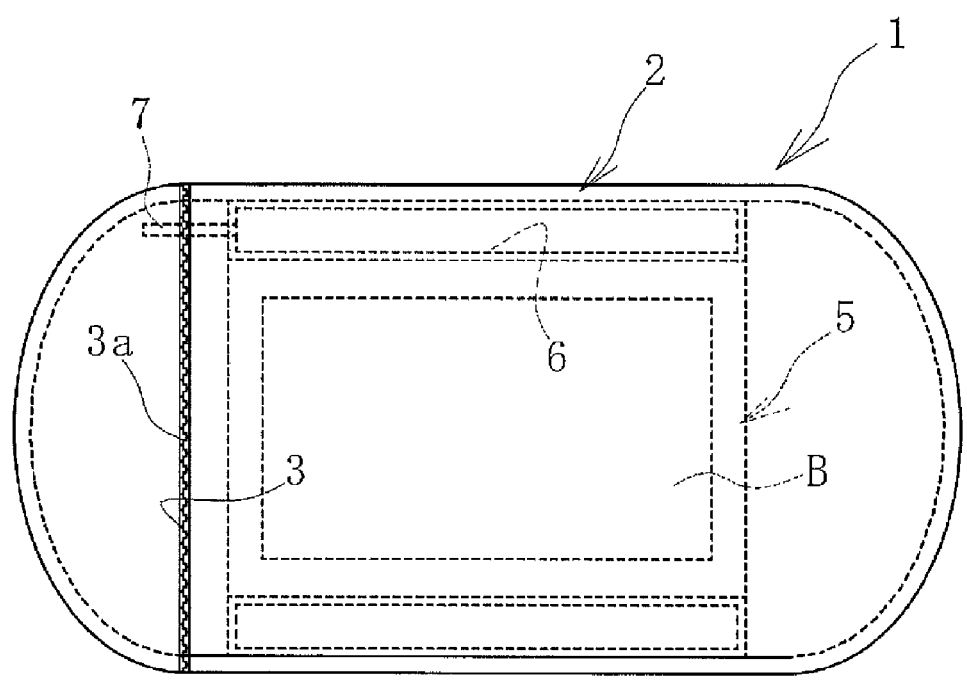
FIG. 1 is an explanatory diagram illustrating an embodiment of a delivery container for a drone in a side view.

A delivery container for a drone according to embodiments of the present invention will be described below with reference to the drawing.

Figure 2:
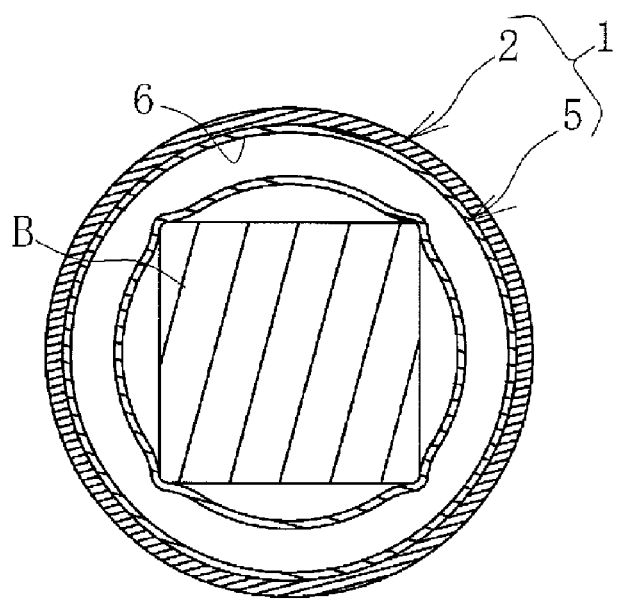
FIG. 2 is an explanatory diagram illustrating the delivery container of FIG. 1 in a cross-sectional view.
Figure 3:
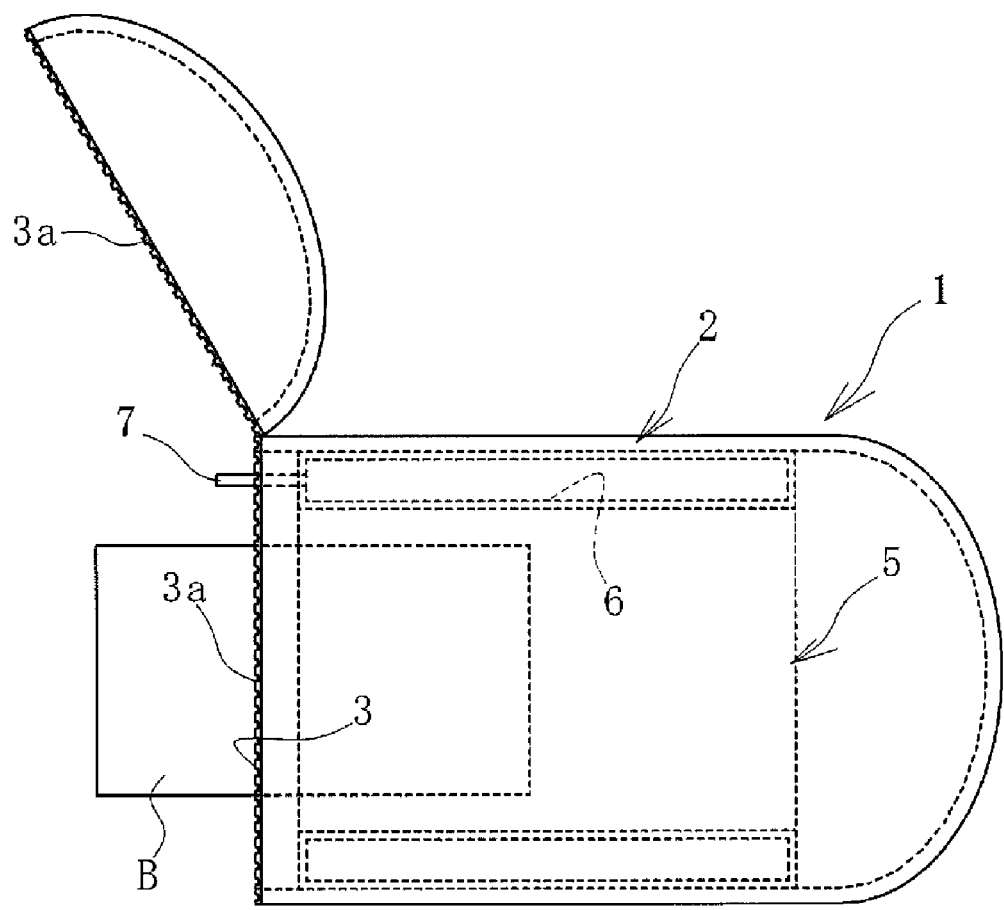
FIG. 3 is an explanatory diagram illustrating a state in which a load opening of FIG. 1 is open.

A delivery container for a drone 1 according to an embodiment illustrated in FIGS. 1 to 3 includes an outer container 2 and a cushioning portion 5 stored inside the outer container 2. The outer container 2 is held by a drone D. The outer container 2 is formed of an elastic material and is watertight. Examples of the elastic material forming the outer container 2 include various vulcanized rubbers, soft resins, and elastomer, and the like. The outer container 2 may be formed of only an elastic material, or may be formed of an elastic material in which a reinforcing wire such as a fiber is embedded. An elastic material having a large number of gas bubbles may also be used for the outer container 2.

Various shapes may be employed for the outer container 2. In this embodiment, the outer container 2 having a cylindrical shape is used. The wall thickness of the outer container 2 is, for example, approximately several mm or more and several cm or less. As shown in FIG. 2, a cylindrical wall of the outer container 2 is a separate body from an outer wall of the cushioning portion 5 and the cylindrical wall is solid being non-hollow.

The outer container 2 is provided with a load opening 3 for taking a load B to be delivered in and out of the outer container 2. The load opening 3 that opens and closes is designed to be watertight. In this embodiment, the load opening 3 is provided at one end side of the shaft of the cylindrical outer container 2.

As a water stop portion 3a, the load opening 3 includes a fastener that is watertight and extends along substantially the entire circumference in the circumferential direction of the outer container 2 having a cylindrical shape, and the load opening 3 is opened and closed by the fastener. In addition to fasteners that engage a pair of pieces, various known fasteners such as surface fasteners can be designed to be watertight and used as the water stop portion 3a.

The cushioning portion 5 is interposed between the load B stored inside the outer container 2 and the outer container 2. Because the cushioning portion 5 is deformed (elastic deformation), the load B is held within a predetermined range inside the outer container 2. The predetermined range is a range in which the load B does not come into direct contact with the outer container 2. Because the cushioning portion 5 is deformed, the load B is held while displacement with respect to the cushioning portion 5 is suppressed. Further, since the cushioning portion 5 is pressed against the inner surface of the outer container 2, the cushioning portion 5 is in a state of being held while displacement with respect to the outer container 2 is suppressed. Since the outer container 2 is pressed from the inside by the cushioning portion 5, the outer container 2 is moderately strained to maintain a predetermined external shape.

The cushioning portion 5 may be formed of a non-elastic material. However, in order to obtain a more excellent cushioning effect, it is preferably formed of an elastic material. Examples of the elastic material forming the cushioning portion 5 include various vulcanized rubbers, soft resins, and elastomer, and the like. The cushioning portion 5 may be formed of only an elastic material, or may be formed of an elastic material in which a reinforcing wire such as a fiber is embedded. An elastic material having a large number of gas bubbles may also be used for the cushioning portion 5.

The cushioning portion 5 preferably includes an air chamber 6 that is sealed in order to obtain a more excellent cushioning effect. When the cushioning portion 5 includes the air chamber 6, the cushioning portion 5 may also be formed of a non-elastic material.

The cushioning portion 5 is preferably disposed so as to cover the entire outer circumference of the load B. When a partial range of the baggage B is made into an uncovered state by the cushioning portion 5, a certain distance (for example, 5 cm or more) is ensured between the partial range in the uncovered state and the inner surface of the outer container 2.

In this embodiment, the cushioning portion 5 having a cylindrical body along the inner circumferential surface of the outer container 2 is included. The air chamber 6 having a cylindrical shape is formed inside the cushioning portion 5. An air injection inlet 7 is provided at an end portion of the cushioning portion 5 at the load opening 3 side. Air can be injected into and discharged from the air chamber 6 through the air injection inlet 7. By adjusting the amount of air injected into the air chamber 6, the cushioning portion 5 is expanded appropriately.

In this embodiment, the cushioning portion 5 is integrated with the outer container 2 and disposed inside the outer container 2. Accordingly, before air is injected into the air chamber 6 to expand the cushioning portion 5, the load B is disposed inside the cylindrical cushioning portion 5, and then air is injected into the air chamber 6 and the cushioning portion 5 is expanded. In this way, the load B is held in the predetermined range inside the outer container 2. Thereafter, the load opening 3 is closed, and the operation of accommodating the load B in the delivery container 1 is completed.

Figure 4:
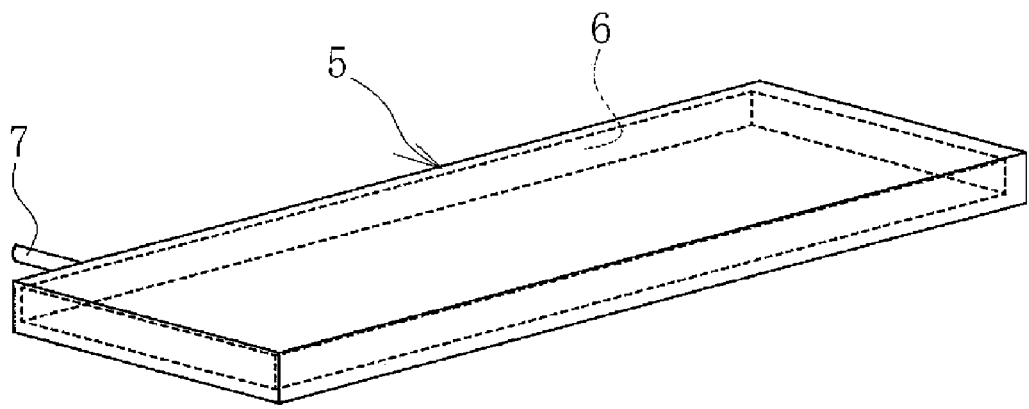
FIG. 4 is an explanatory diagram illustrating a modified example of a cushioning portion of FIG. 1.

As illustrated in FIG. 4, the cushioning portion 5 may be separated from the outer container 2 so that the cushioning portion 5 can be put into and taken out of the outer container 2. In the cushioning portion 5, the air chamber 6 is formed inside the cushioning portion 5 having a flat plate shape. This flat plate-shaped cushioning portion 5 wraps the load B and is formed into a cylindrical body, and then is stored inside the outer container 2. Thereafter, air is injected into the air chamber 6 to expand the cushioning portion 5, and the load B is held in a predetermined range inside the outer container 2.

The delivery container 1 is used as follows when delivering the load B.

Figure 5:
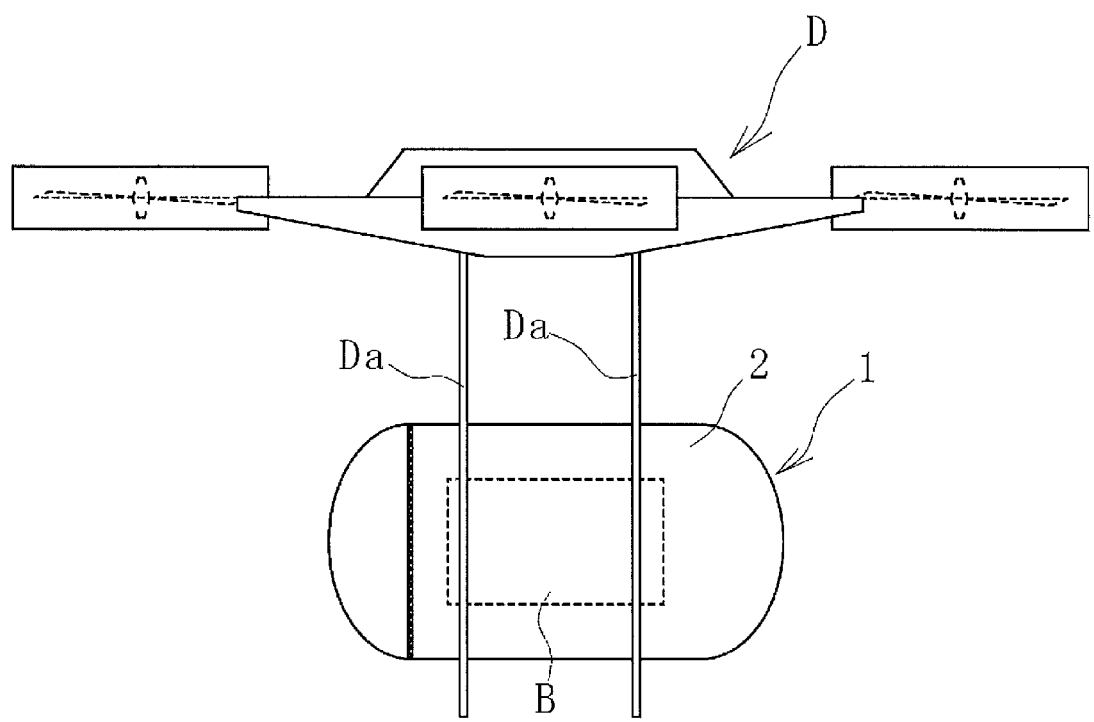
FIG. 5 is an explanatory diagram illustrating a state in which the load stored in the delivery container of FIG. 1 is delivered by a drone.

As illustrated in FIG. 5, the delivery container 1 in which the load B is stored is held in a holding arm Da of the drone D flying by remote control or automatic control, and is delivered by air from the delivery source to the destination. When the delivery container 1 arrives at the destination, the holding by the holding arm Da is released, the delivery container 1 is separated from the drone D, and the delivery is completed.

Even when the delivery container 1 falls from an unintended height when the holding by the holding arm Da is released or during delivery, in the delivery container 1, the outer container 2 formed of an elastic material and the cushioning portion 5 exhibit the cushioning function. That is, by the cushioning effect of the outer container 2 and the cushioning effect of the cushioning portion 5, the load B is protected from the impact force generated when dropped. When the cushioning portion 5 formed of an elastic material or the cushioning portion 5 having the air chamber 6 is used, the cushioning effect is further improved, which is more advantageous for protecting the load B from the impact force.

Since the outer container 2 is watertight and the load opening 3 is also designed to be watertight, moisture is prevented from entering the inside of the outer container 2. Thus, even in a case of delivery in rainy weather or the like, the use of this delivery container 1 prevents the load B from getting wet. As described above, while the delivery container 1 has a simple configuration, it is possible to more reliably protect the load B.

When the load B is displaced inside the outer container 2 during delivery, the balance of the drone D is lost and the flight becomes unstable. However, in this delivery container 1, the load B is held in a state where displacement with respect to the cushioning portion 5 is suppressed, and the cushioning portion 5 is held in a state where displacement with respect to the outer container 2 is suppressed. Thus, the displacement of the load B is unlikely to occur inside the outer container 2 during delivery, which is advantageous for the stable flight of the drone D. Further, since the outer container 2 is pressed from the inside by the cushioning portion 5 to maintain a predetermined external shape, the external shape of the outer container 2 does not easily change during delivery. From this perspective, it is advantageous for the stable flight of the drone D.

When the cushioning portion 5 has one air chamber 6, the cushioning effect of the cushioning portion 5 is reduced when the air chamber 6 is damaged. Thus, it is preferable that the cushioning portion 5 includes a plurality of independent air chambers 6.

Figure 6:
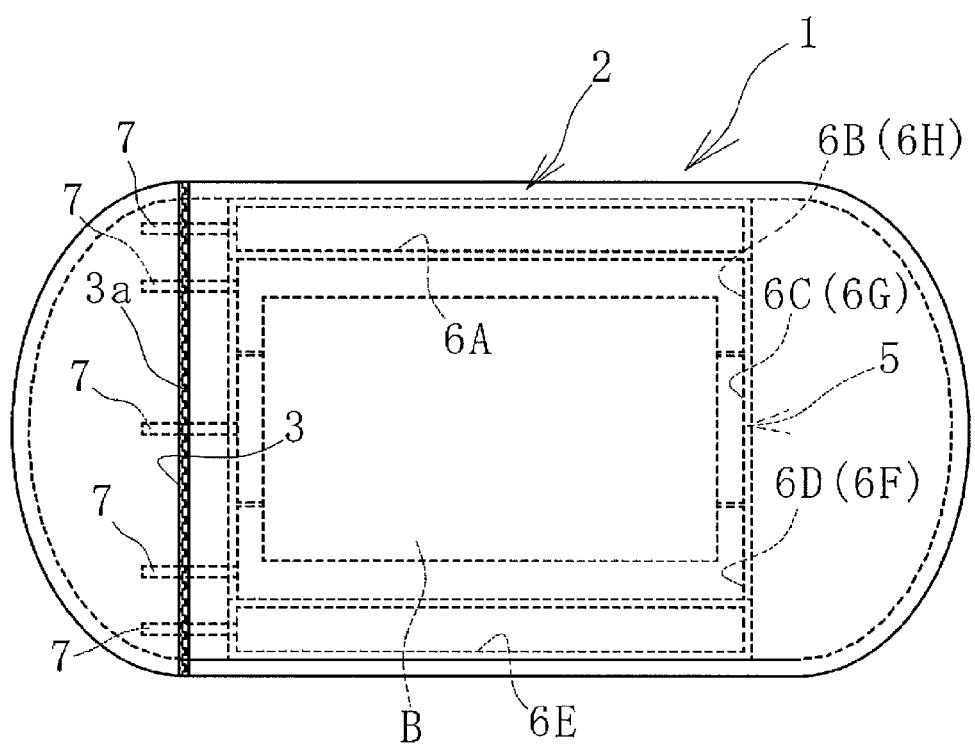
FIG. 6 is an explanatory diagram illustrating another embodiment of the delivery container in a side view.
Figure 7:
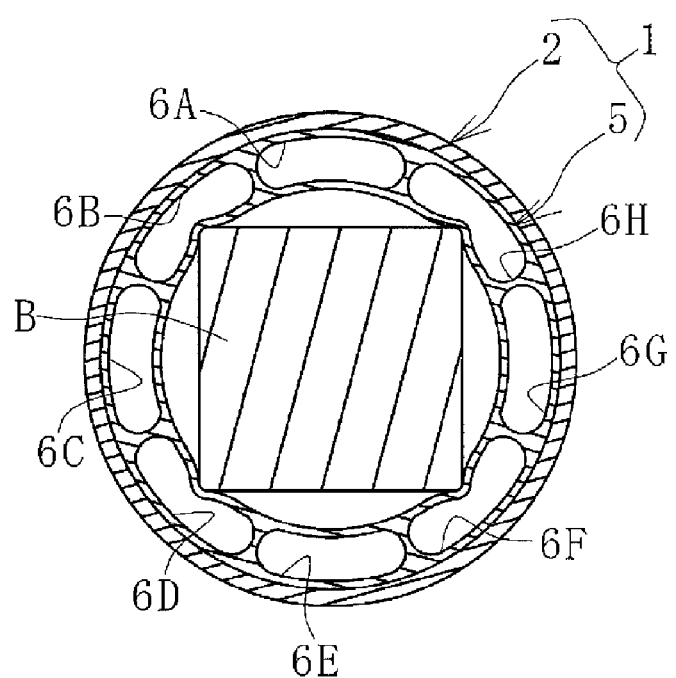
FIG. 7 is an explanatory diagram illustrating the delivery container of FIG. 6 in a cross-sectional view.

In the embodiment of the delivery container 1 illustrated in FIGS. 6 to 7, the cushioning portion 5 has a plurality of independent air chambers 6 (6A, 6B, 6C, 6D, 6E, 6F, 6G, and 6H). Each of the air chambers 6 has a columnar shape, and these columnar air chambers 6 are arranged side by side in a cylindrical shape, and the cushioning portion 5 is formed in a cylindrical body. The cushioning portion 5 is integrated with the outer container 2 and disposed inside the outer container 2. The load B is held inside the cushioning portion 5 in the cylindrical body. The number of air chambers 6 is determined as appropriate. According to this embodiment, even when one air chamber 6 is damaged, the cushioning effect can be obtained by the remaining healthy air chamber 6.

Figure 8:
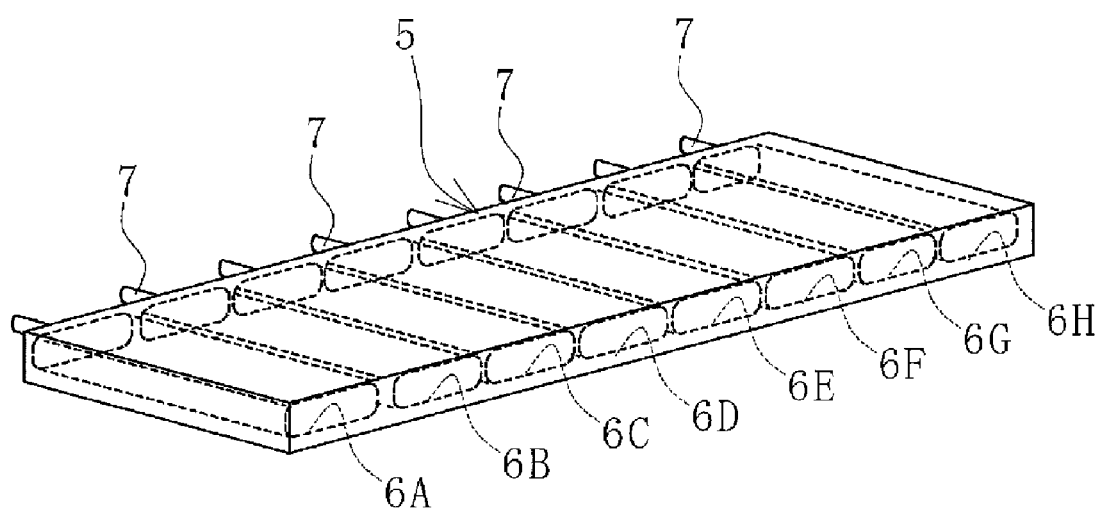
FIG. 8 is an explanatory diagram illustrating a modified example of the cushioning portion of FIG. 6.

As illustrated in FIG. 8, this cushioning portion 5 may also be separated from the outer container 2 so that the cushioning portion 5 can be put into and taken out of the outer container 2. In this cushioning portion 5, a plurality of columnar independent air chambers 6 (6A, 6B, 6C, 6D, 6E, 6F, 6G, and 6H) are formed side by side inside the cushioning portion 5 having a flat plate shape. This cushioning portion 5 wraps the load B and is formed into a cylindrical body, and then is stored inside the outer container 2. Thereafter, air is injected into each air chamber 6 to expand the cushioning portion 5, and the load B is held in a predetermined range inside the outer container 2.

Figure 9:
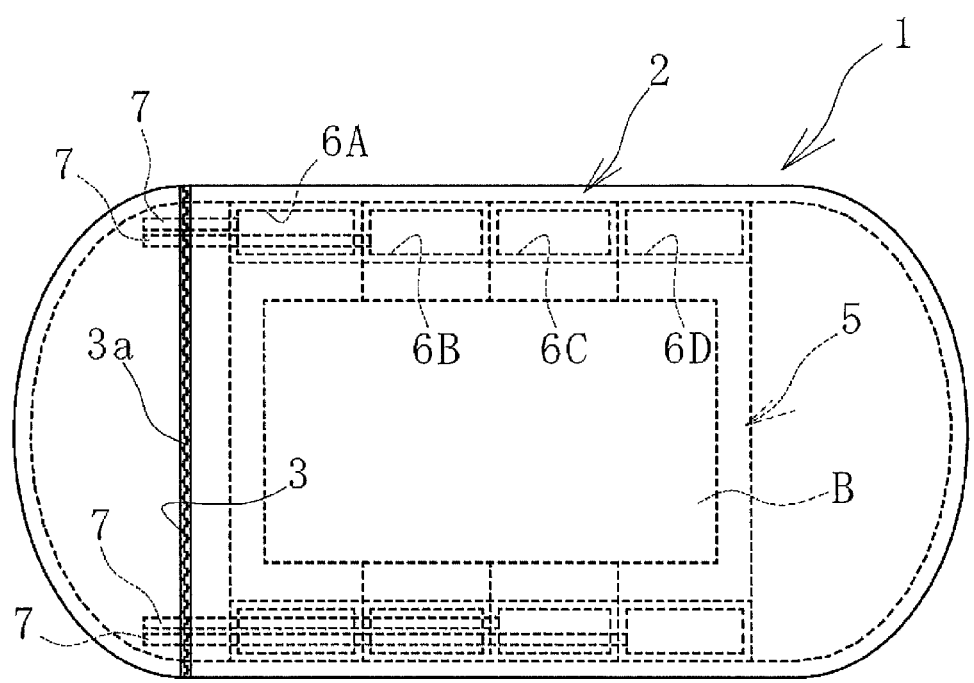
FIG. 9 is an explanatory diagram illustrating another embodiment of the delivery container in a side view.
Figure 10:
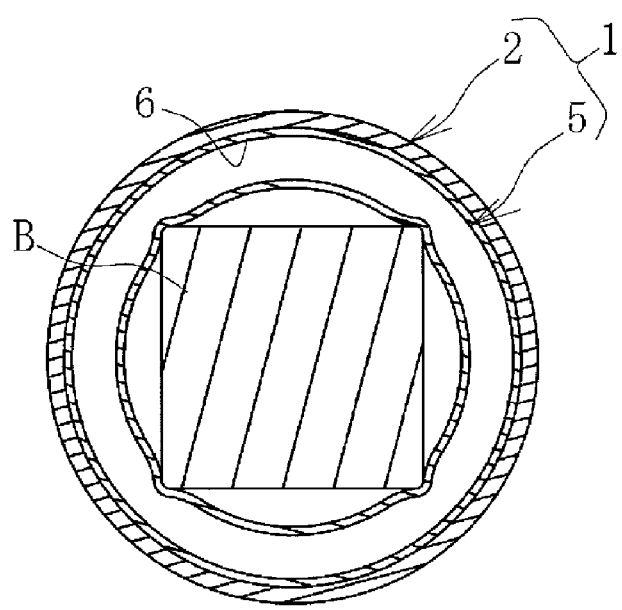
FIG. 10 is an explanatory diagram illustrating the delivery container of FIG. 9 in a cross-sectional view.

In the embodiment of the delivery container 1 illustrated in FIGS. 9 to 10, the cushioning portion 5 has a plurality of independent air chambers 6 (6A, 6B, 6C, and 6D). Each of the air chambers 6 is annular, and these annular air chambers 6 are arranged side by side in the width direction, and the cushioning portion 5 is formed in a cylindrical body. The cushioning portion 5 is integrated with the outer container 2 and disposed inside the outer container 2. The load B is held inside the cushioning portion 5 in the cylindrical body. The number of air chambers 6 is determined as appropriate. According to this embodiment, even when one air chamber 6 is damaged, the cushioning effect can be obtained by the remaining healthy air chamber 6.

Figure 11:
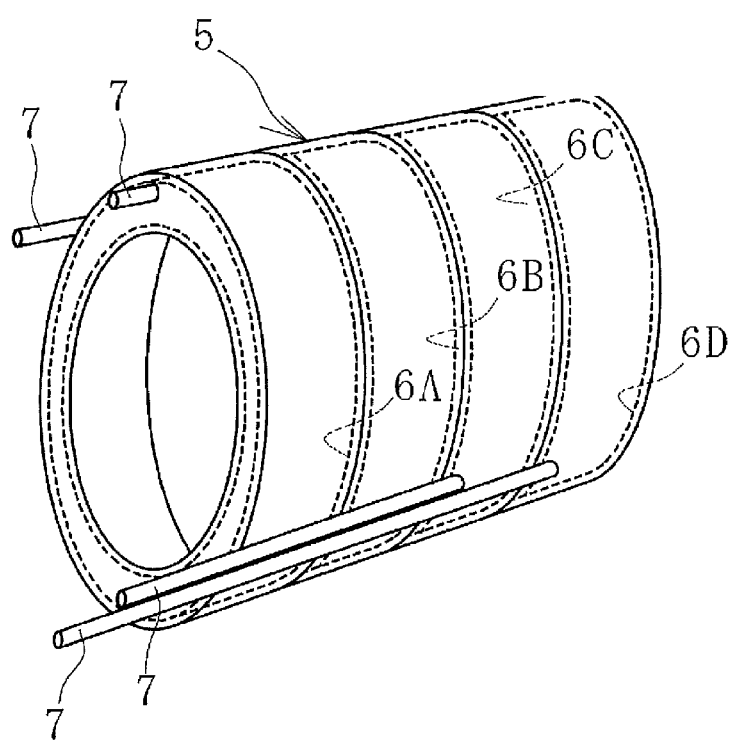
FIG. 11 is an explanatory diagram illustrating a modified example of the cushioning portion of FIG. 9.

As illustrated in FIG. 11, this cushioning portion 5 may also be separated from the outer container 2 so that the cushioning portion 5 can be put into and taken out of the outer container 2. A plurality of independent annular air chambers 6 (6A, 6B, 6C, and 6D) are arranged side by side, and the cushioning portion 5 is formed in a cylindrical body. The load B is inserted into each annular air chamber 6 (in a state where air is slightly injected), and then this cushioning portion 5 is stored inside the outer container 2. Thereafter, air is injected into each air chamber 6 to expand the cushioning portion 5, and the load B is held in a predetermined range inside the outer container 2.

Figure 12:
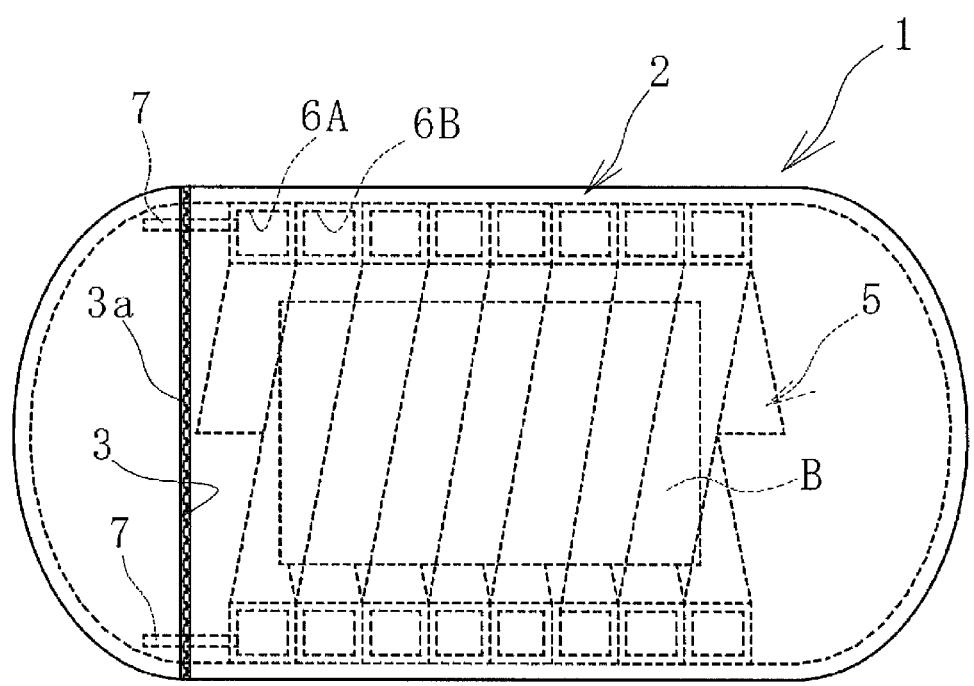
FIG. 12 is an explanatory diagram illustrating another embodiment of the delivery container in a side view.
Figure 13:
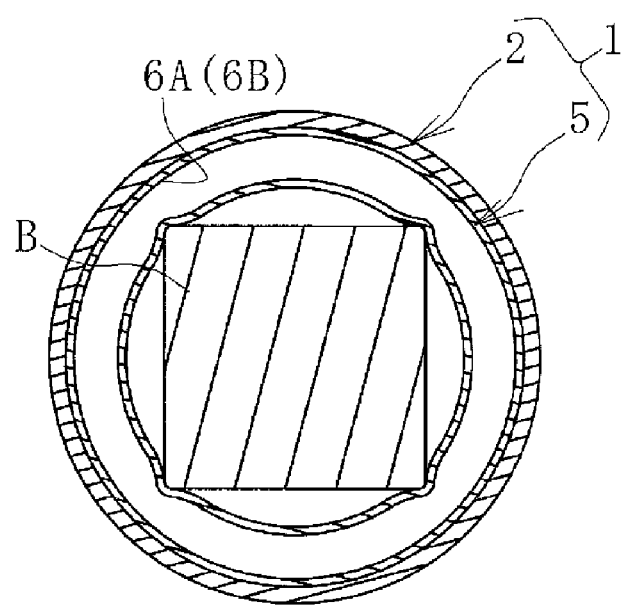
FIG. 13 is an explanatory diagram illustrating the delivery container of FIG. 12 in a cross-sectional view.

In the embodiment of the delivery container 1 illustrated in FIGS. 12 to 13, the cushioning portion 5 has a plurality of independent air chambers 6 (6A and 6B). Each of the air chambers 6 has a columnar shape, and these columnar air chambers 6 are arranged side by side in a spiral shape, and the cushioning portion 5 is formed in a cylindrical body. The cushioning portion 5 is integrated with the outer container 2 and disposed inside the outer container 2. The load B is held inside the cushioning portion 5 in the cylindrical body. The number of air chambers 6 is determined as appropriate. According to this embodiment, even when one air chamber 6 is damaged, the cushioning effect can be obtained by the remaining healthy air chamber 6.

Figure 14:
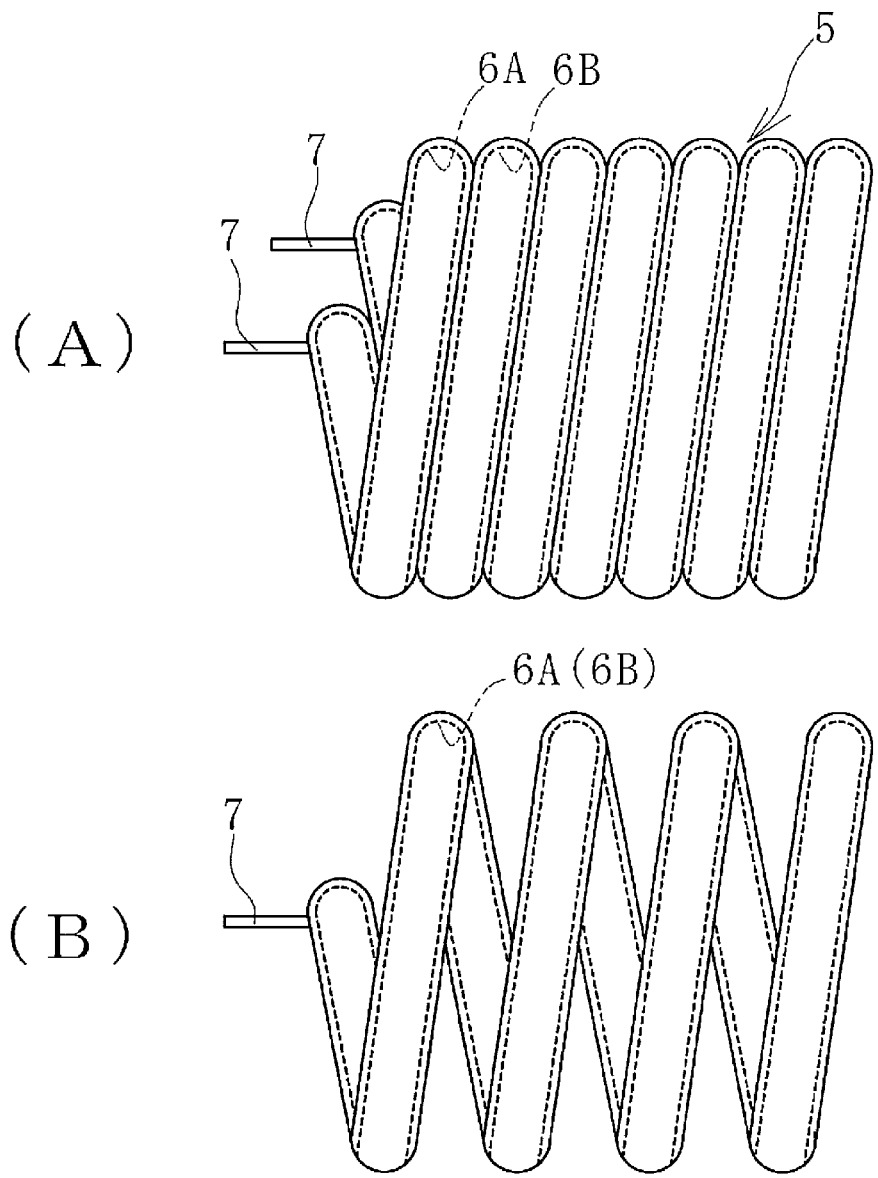
FIG. 14 illustrates a modified example of the cushioning portion of FIG. 12.

As illustrated in FIG. 14, this cushioning portion 5 may also be separated from the outer container 2 so that the cushioning portion 5 can be put into and taken out of the outer container 2. A plurality of independent columnar air chambers 6 (6A and 6B) are arranged side by side in a spiral shape, and the cushioning portion 5 is formed in a cylindrical body. FIG. 14A illustrates a state in which two spiral air chambers 6A and 6B are combined side by side, and FIG. 14B illustrates a state in which the air chambers 6A and 6B are separated. The load B is inserted into each spiral air chamber 6 (in a state where air is slightly injected), and then this cushioning portion 5 is stored inside the outer container 2. Thereafter, air is injected into each air chamber 6 to expand the cushioning portion 5, and the load B is held in a predetermined range inside the outer container 2.

Figure 15:
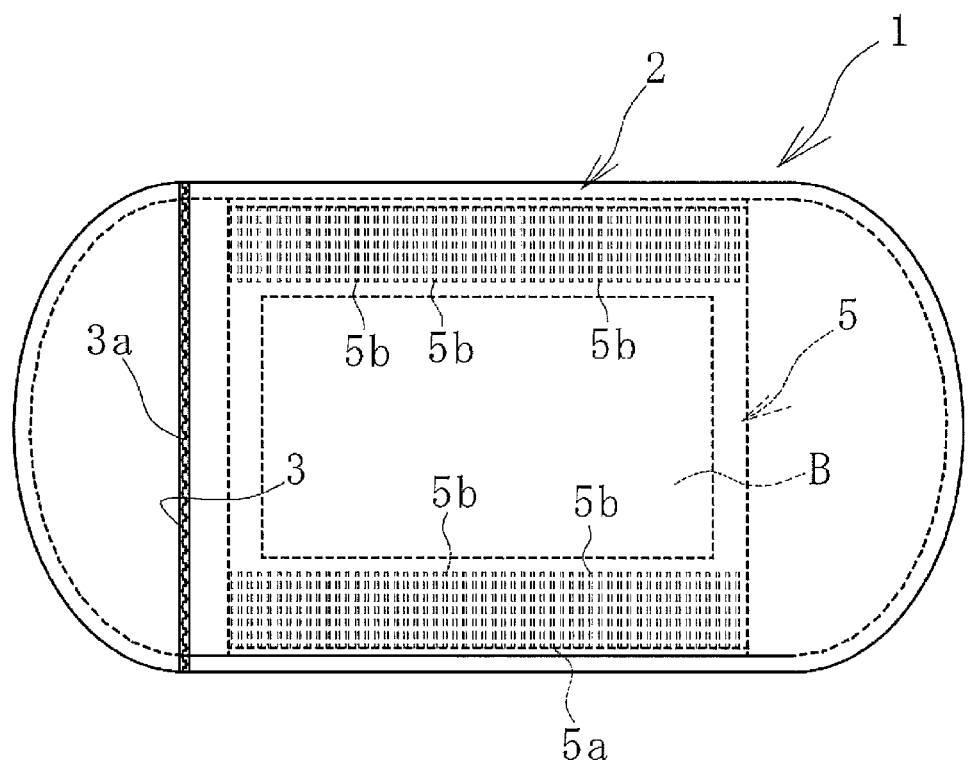
FIG. 15 is an explanatory diagram illustrating another embodiment of the delivery container in a side view.
Figure 16:
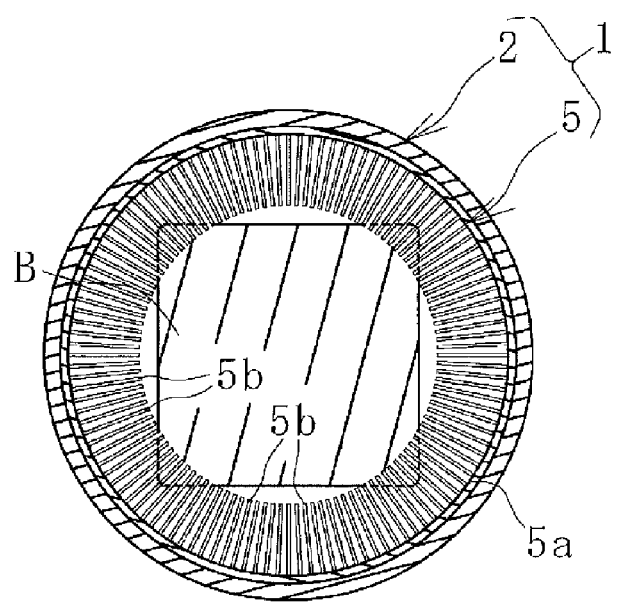
FIG. 16 is an explanatory diagram illustrating the delivery container of FIG. 15 in a cross-sectional view.

In the embodiment of the delivery container 1 illustrated in FIGS. 15 to 16, the cushioning portion 5 includes a large number of linear members 5b formed of elastic members protruding from the inner surface side of the outer container 2 and is formed in a cylindrical body. These linear members 5b are disposed projecting on the surface of a base 5a having a flat plate shape. Inside the cushioning portion 5 in the cylindrical body, the load B is held in a state of being supported by a large number of elastic linear members 5b. As shown in FIG. 16, when the load B is disposed inside of the cushioning portion at least a part of the load will be in a state of being embedded in a position midway in protruding direction of the linear members. For the specification of the linear members 5b (length, thickness, distribution density, and the like), a test or simulation of the cushioning effect of the cushioning portion 5 is performed in advance to determine the appropriate specification.

In this embodiment, the cushioning portion 5 is integrated with the outer container 2 and disposed inside the outer container 2. Accordingly, when the load B is disposed inside the cushioning portion 5 having the cylindrical body, the load B is held within a predetermined range inside the outer container 2. Thereafter, the load opening 3 is closed, and the operation of accommodating the load B in the delivery container 1 is completed.

Figure 17:
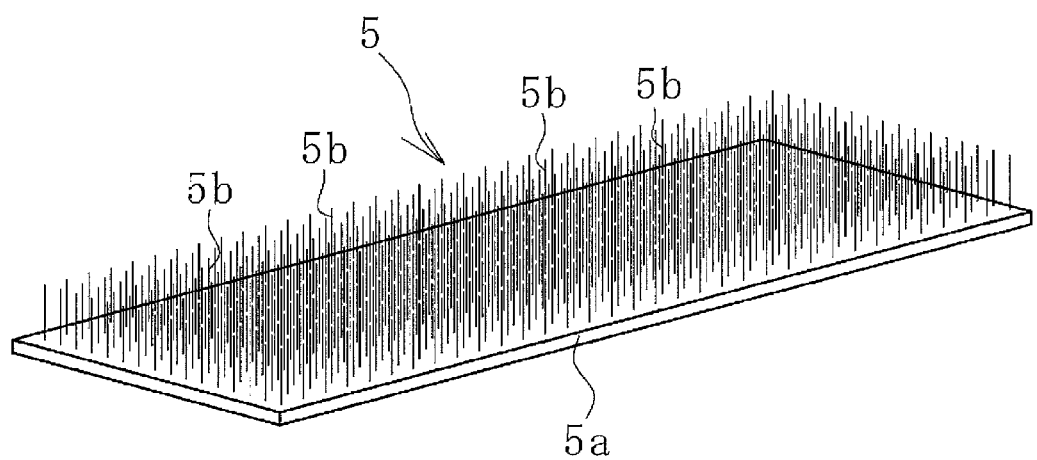
FIG. 17 is an explanatory diagram illustrating a modified example of the cushioning portion of FIG. 15.

As illustrated in FIG. 17, this cushioning portion 5 may also be separated from the outer container 2 so that the cushioning portion 5 can be put into and taken out of the outer container 2. In this cushioning portion 5, a large number of linear members 5b formed of an elastic material projecting from one surface of the base 5a having a flat plate shape. The cushioning portion 5 wraps the load B and is formed into a cylindrical body and then is stored inside the outer container 2, so that the load B is held within a predetermined range inside the outer container 2.

Various shapes can be employed for the outer container 2, but in order to reduce the air resistance received during delivery, for example, the outer container 2 may be formed in a simple spherical shape or an elliptical spherical shape such as a rugby ball to have a shape having a streamlined surface. Further, the outer container 2 preferably has a shape having as few corners as possible, and even in a case of a cylindrical shape, the corners preferably have an arc shape (round shape).

Figure 18:
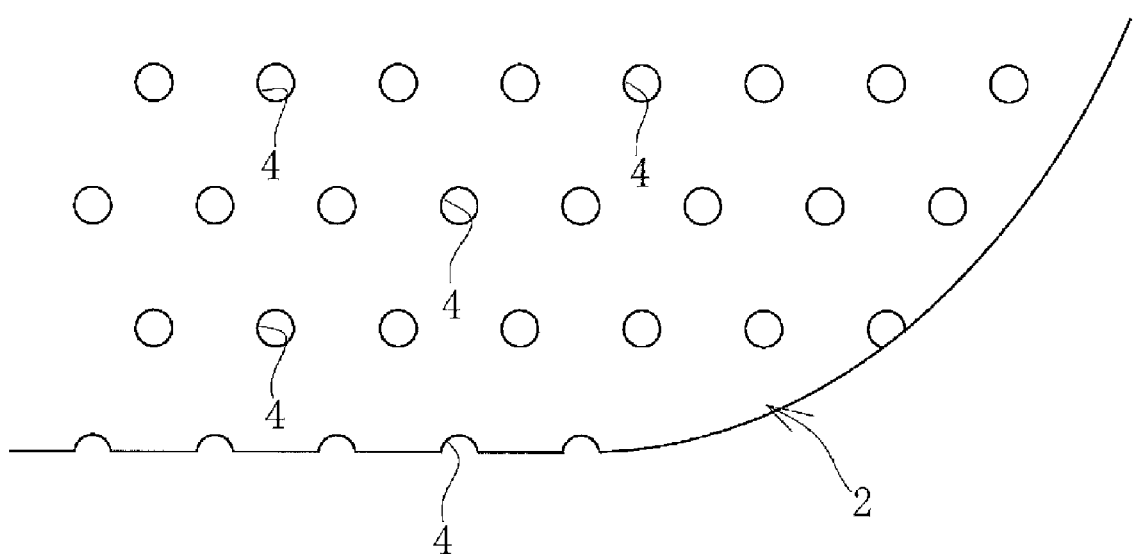
FIG. 18 is an enlarged view illustrating a modified example of the outer surface of the outer container.

As illustrated in FIG. 18, a large number of dimples 4 may be scattered on the outer surface of the outer container 2 like a golf ball. These dimples 4 make the flow of air around the outer surface of the outer container 2 appropriately turbulent during delivery. Along with this, the air resistance received by the outer container 2 is reduced, and an additional load acting on the drone D during delivery can be reduced. For the specification of the dimple 4 (size, shape, distribution density, and the like), an air resistance test or simulation of the outer container 2 is performed in advance to determine the appropriate specification.

REFERENCE SIGNS LIST

1 Delivery container
2 Outer container
3 Load opening
3a Water stop portion
4 Dimple
5 Cushioning portion
5a Base
5b Linear member
6 (6A, 6B, 6C, 6D, 6E, 6F, 6G, 6H) Air chamber
7 Air injection inlet
B Load
D Drone
Da Holding arm

The invention claimed is:

1. A delivery container for a drone, comprising:
an outer container held by a drone; and
a cushioning portion stored inside the outer container,
the outer container being formed of an elastic material and being watertight, and a load opening of the outer container that opens and closes being designed to be watertight, and
the cushioning portion being interposed between a load stored inside the outer container and the outer container to hold the load within a predetermined range inside the outer container, wherein
the outer container elastic material is at least one of a vulcanized rubber, a soft resin and an elastomer,
a cylindrical wall of the outer container is a separate body from an outer wall of the cushioning portion and the cylindrical wall is solid being non-hollow, and
the cushioning portion is configured to be deformed due to the load disposed inside of the cushioning portion, and a predetermined shape of the outer container is maintained by the outer container being strained due to the outer wall of the cushioning portion pressing against an inner surface of the cylindrical wall of the outer container.

2. The delivery container for a drone according to claim 1, wherein the cushioning portion is integrated with the outer container and disposed inside the outer container.

3. The delivery container for a drone according to claim 1, wherein the cushioning portion is configured to be separated from the outer container and taken in and out of the outer container.

4. The delivery container for a drone according to claim 1, wherein the cushioning portion is formed of an elastic material.

5. The delivery container for a drone according to claim 1, wherein the cushioning portion comprises an air chamber that is sealed.

6. The delivery container for a drone according to claim 5, wherein a plurality of the air chambers are provided with each being independent.

7. The delivery container for a drone according to claim 6, wherein each of the air chambers has a columnar shape, and the air chambers each having the columnar shape are arranged side by side in a cylindrical shape and the cushioning portion is formed in a cylindrical body, and the load is held inside the cylindrical body.

8. The delivery container for a drone according to claim 6, wherein each of the air chambers is annular, and the air chambers each being annular are arranged side by side in a width direction and the cushioning portion is formed in a cylindrical body, and the load is held inside the cylindrical body.

9. The delivery container for a drone according to claim 6, wherein each of the air chambers has a columnar shape, and the air chambers each having the columnar shape are arranged side by side in a spiral shape, a spiral shape portion of each of the air chambers is disposed alternately in a spiral axial direction with adjacent ones of the air chambers being in contact with each other, and the cushioning portion is formed in a cylindrical body, and the load is held inside the cylindrical body.

10. The delivery container for a drone according to claim 4, wherein the cushioning portion comprises a large number of linear members protruding in a linear shape from an inner surface side of the outer container, the cushioning portion being configured such that when the load is disposed inside of the cushioning portion at least a part of the load will be in a state of being embedded in a position midway in protruding direction of the linear members.

11. The delivery container for a drone according to claim 1, wherein a large number of dimples are scattered on an outer surface of the outer container.

12. The delivery container for a drone according to claim 1, wherein the load opening includes a fastener and the load opening is opened and closed by the fastener.

* * * * *